3,329,632
PHENOLIC RESIN ADHESIVES EXTENDED WITH CARBON AND CAUSTICIZED AMYLACEOUS MATERIALS
Fred Bryner, Midland, Mich., assignor to The Dow Chemical Company, Midland, Mich., a corporation of Delaware
No Drawing. Filed Nov. 21, 1966, Ser. No. 595,629
22 Claims. (Cl. 260—17.2)

ABSTRACT OF THE DISCLOSURE

The present invention relates to novel adhesive compositions comprising phenolic resins, finely divided carbon extenders, basic catalysts and water. Highly extended phenolic resin adhesives are provided.

---

This application is a continuation-in-part of the previously filed and copending applications Serial Nos. 213,852 and 213,878, each filed August 1, 1962 now abandoned.

The use of partially condensed phenol-aldehyde resins in thermosetting, adhesive formulations is a well-established art. Most of such formulations, when ready for use, comprise, in addition to the resin, a liquid solvent medium, a catalyst to promote resin cure, an extender or filler and sometimes special additives to control such characteristics of the glue as its flowability, rate of cure, spreadability, viscosity and like properties.

Of primary concern herein are the extenders for phenolic resins, i.e., materials added to reduce the quantity of resin solids required in a given adhesive formulation. In the past, various extenders have been indicated to be useful in amounts up to as much as one part by weight per part by weight of resin solids. At such levels of extension, however, the adhesive formulations have generally been inadequate for the manufacture of exterior grade plywoods according to Douglas Fir Plywood commercial standards. For a definition of these standards, see the publication "Douglas Fir Plywood Commercial Standard CS45-55."

A good extender in the prior art is that taught by Ash et al., in U.S. Patent 2,727,869. While this patent discloses that up to about 100 percent extension with the particular organic filler described therein is permissible, a maximum extension within the range from about 25 to 65 percent based on the resin solids must be observed if exterior grade plywood is to be manufactured with the resulting adhesive.

It would be desirable to provide a highly extended, liquid adhesive composition based on thermosetting phenolic resins. It would be especially desirable to provide a phenolic resin adhesive formulation, suitable for exterior grade plywood manufacture, characterized by substantially greater extension of the resin than that heretofore attained in such adhesive formulations. These and other objectives are accomplished in the present invention which is hereinafter set forth.

According to the present invention, an improved highly extended phenolic resin adhesive formulation is prepared by uniformly mixing with a liquid, aqueous phenolic resin, a material proportion up to about 3 parts by weight per part of the phenolic resin solids, of a finely divided, solid carbon extender. The formulation is completed by the addition of a catalyst for the thermosetting reaction of the resin and a sufficient amount of an aqueous dispersing medium to provide a liquid composition.

In a further embodiment of the present invention, an improved and highly extended phenolic resin adhesive is obtained by uniformly incorporating into a standard phenolic resin adhesive formulation an amount from about 0.1 part up to about 3 parts by weight, per part of the phenolic resin solids, of a finely divided solid carbon extender. A standard phenolic resin adhesive formulation contains, in addition to a thermosettable, soluble phenolic resin, effective amounts of a water-dispersible, causticized organic extender and a basic catalyst for the thermosetting reaction. Also enough of an aqueous solvent is employed as a dispersing medium to provide a liquid formulation.

The terminology "finely divided" as applied to the carbon extender, means that the carbon extender is characterized by an average particle size small enough to pass through an 80 mesh screen of the Tyler mesh series. "Carbon extender," as employed herein, refers to a material rich in elemental carbon, e.g., coaly. Although attention to the aforementioned particle size limit provides highly efficacious results, even smaller particle sizes, such as will pass through a 160 mesh screen of the Tyler series, produce even better results. It is preferred, though not essential, that the carbon extenders employed have an adsorbing surface area less than about 100 square meters per gram.

Materials that may be utilized as the carbon extenders, when in a suitable pulverulent form, include carbons such as the thermal carbon blacks and essentially carbonaceous materials composed mostly of carbon in the form of complex aromatic nuclei such as natural and manufactured graphites, coals, cokes and the like. Specific carbon blacks include channel blacks, oil furnace blacks, gas furnace blacks and similar thermal blacks. Particular coals to be used include anthracite and the various grades of bituminous coals.

Phenolic resins suitable for employment in the invention are thermosetting, base catalyzed, resinous condensation products (soluble in aqueous solvents) of one or more hydroxy aromatic compounds (phenols) and one or more suitable aldehydic materials. Aldehydic, as employed herein, refers to aldehydes and similarly acting materials. From about 1.8 to about 3, preferably from 2.0 to 2.3 chemical equivalents of the aldehydic material are reacted with each mole of the phenol used. Particular resinous products are obtained by partially condensing, in appropriate proportions to provide a thermosetting product, a phenol, such as phenol, cresol, resorcinol or 3,5-xylenol with a suitable aldehydic material. Specific examples of suitable aldehydes, or similarly acting materials, are aqueous formaldehyde, para-formaldehyde, trioxymethylene and the like methylene providing materials. Also operable are acetaldehyde, furfuraldehyde and the like aldehydic materials which react with the mentioned phenols to form soluble, intermediate, polycondensation products.

It will be observed that the phenols specified are those having at least 3 reactive ring positions, i.e., at least 3 nuclear carbon atoms having substituent hydrogen atoms in ring positions ortho and para to a hydroxy group. If desired, other phenols having less than three active positions can be used in admixture with one or more of the above-mentioned phenols, but it is essential in order to provide a thermosetting composition that at least the predominant portion of the phenolic reactant is of the class having 3 active ring positions.

The above thermosetting phenolic resins are normally prepared in the presence of an aqueous solvent with the aid of a basic catalyst. The usual procedure is to mix desired proportions of the resin forming reactants into a sufficient amount of an aqueous solvent to provide a liquid reaction system having from about 30 to about 60, preferably 38 to 50 percent by weight solids. A basic catalyst is added to the reaction mixture and the resulting system is heated at an elevated temperature to proide a partially condensed, fusible resin, which is at least water-dispersible, if not completely water-soluble, in the presence of alkali. Exemplary aqueous solvents, include, in addition to water, mixtures of water with water-soluble alcohols and ketones. Generally, any organic solvent miscible with water and essentially inert to the condensing reactants can be used as the reaction medium.

The water-dispersible, causticized organic extender, mentioned above as a fundamental component of the standard phenolic resin formulation, may be completely soluble in water, or merely swellable therein, but in any event, is capable of forming a homogeneous dispersion in water. Organic materials that can be suitably causticized by treatment with an alkali metal hydroxide to provide the causticized organic extenders include amylaceous materials, i.e., containing starches, such as may be obtained by processing wheat, corn, oats, rye and the like grains. Other sources of causticizable organic materials are the residues obtained by chemical treatment of oat hulls, corn cobs and the like remnants of grain processing. Wood and walnut shell flours and soluble extracts of wood bark also can be suitably causticized. The amount of the alkali metal hydroxide used to causticize the aforementioned organic materials will normally fall within the limits from about 5 to about 35 percent by weight of the organic materials to be causticized.

It should be understood that standard phenolic resin adhesive formulations used in conjunction with the carbon extenders according to one embodiment of the invention may, and often do, involve the use of causticized forms of more than one of the aforementioned organic materials. For instance, it will be recognized by those skilled in the art that causticized forms of certain of the aforementioned organic materials can be added to the formulation as thickeners or glue line control agents as well as extenders for the resin solids. Moreover, still other organic materials are often used as optional thickeners. Examples of these materials are the naturally occurring and synthetic water-soluble gums such as gum arabic, karaya gum, locust bean gum, alginate, casein, soluble blood albumin and water-soluble cellulose ethers.

Regardless of the purpose for which it is added, enough of the water-dispersible causticized organic extender is employed to provide from 0.01 up to as much as 1 part by weight thereof per part by weight of resin solids in the final adhesive formulation. For best results with the carbon extenders of the invention, it is preferred to maintain the conjunctive extension with the water-dispersible causticized organic extenders within the range from about 0.05 to about 0.5 part by weight thereof per part by weight of the resin solids.

Another fundamental component of the adhesive formulations of the invention is a small, but catalytically effective, amount of a catalyst for thermosetting or curing the phenolic resin. The catalyst is basic in nature and may be inorganic or organic. Examples of suitable basic catalysts are the alkali metal hydroxides (an excess of the alkali metal hydroxide used to causticize the organic extender is satisfactory), alkali metal carbonates, alkali metal silicates, alkali metal borates, alkali metal phosphates, ammonium hydroxide or such water-soluble basic organic compounds as the amines including primary, secondary and tertiary alkylamines or arylamines. Examples of the latter materials are methylamine, dimethylamine, trimethylamine, ethylenimine, pyridine, aniline and the like. A preferred catalyst system utilizes an alkali metal carbonate in an amount of from about 2 to 20 percent by weight of the resin solids.

The solid adhesive formulation components of the invention are dispersed or dissolved, as the case may be, in a sufficient amount of an aqueous solvent medium, which may be water or mixtures thereof with a water-soluble alcohol, to provide a readily flowable or mechanically spreadable composition. For most applications, the total solids of the extended glue compositions of the invention are within the range from about 35 to about 65 percent by weight of the total composition. Preferably, the solids content of the glue composition is within the range from about 40 to 55 percent by weight of the total composition.

The adhesive compositions of the invention, with a total extension of as much as 250 percent, i.e., 2.5 parts of total extender per part of resin, are suitable for the manufacture of exterior grade plywood. When lesser grades of plywood are desired, effective results are accomplished with the levels of total extension as great as 300 percent or more based on the resin solids used. The actual amount of the carbon extender used will, of course, vary with the extent of conjunctive extension with the water-dispersible causticized organic extenders. With normal usage of the latter extender, the amount of the carbon extender employed will be sufficient to provide at least 50 percent and up to as much as 250 percent extension of the resin. Whenever the water-dispersible causticized organic extenders are omitted from the formulations, as they may be, in the first embodiment of the invention, it is preferred practice to use from 100 to 250 percent extension with the carbon extender. Optionally, a small amount of a water-soluble gum is added to such a formulation as a viscosity control. Suitable gums include the naturally occurring and synthetic gums such as gum arabic, karaya gum, locust bean gum, alginate, casein, soluble blood albumin and the water-soluble cellulose ethers. Usually from about 0.01 to 0.1 part of such gums per part of resin solids produces satisfactory results.

The aforedescribed glue formulations can be prepared from the described constituents by introducing them in any order into a container suitably equipped with agitating means. They are stirred or otherwise mixed, preferably at room temperature, until a uniform blend of a desired consistency is obtained. The blend consistency can be controlled by adjusting the amount of aqueous solvent medium used within the aforementioned limits.

If it is desired to prepare in situ the water-dispesible, causticized organic extender used in the second mentioned embodiment of the invention while formulating the glue, the mixing of the ingredients must be according to a predetermined order. For convenience in describing this order of addition, the components of an extended adhesive composition of the invention will be given the designations set forth in the following schedule.

Designation: Component
A ____. Alkali metal hydroxide for causticizing the organic extender.
C ____. Basic catalyst for the thermosetting reaction of the phenolic resin.
$E_A$ ___. Extending organic material reactive with alkali metal hydroxides.
$E_C$ ___ Finely divided, solid, carbon extender.
M ___ Aqueous solvent medium.
R ____. Soluble phenolic resin.

In mixing the aforementioned ingredients, the order in which they are brought together is critical. The general mixing order is set forth below for those materials or groups of materials for which the sequence of addition must be controlled. Within the brackets are materials for which the order of addition is immaterial. The mixing schedule proceeding from left to right is as follows: $[M,E_A,E_C]_1$ $[M,A,C]_2$ $[E_A]_3$ $[M,R,E_C,C]_4$ $[M,R]_5$. For example, the materials within the brackets $[M,A,C]_2$ are added to a mixture of the materials within the brackets $[M,E_A,E_C]_1$; the material within the brackets $[E_A]_3$ is added to the resulting mixture of the materials in $[M,E_A,E_C]_1$ and $[M,A,C]_2$; etc.

In any one group of materials, the components therein can be added simultaneously or in any order. Though mixing with the addition of each of the components is preferred, it is not necessary. When, in the foregoing schedule, a component appears in more than one group of materials to be added, the total amount thereof to be added can be apportioned, as desired, among the indicated points of addition so as to provide the resulting mixture with a convenient consistency for mixing. This is particularly true of the aqueous solvent medium (M). It is added to the formulation, as needed, to produce a consistency permitting easy mixing and effective application to a surface to be bonded.

The extended adhesive formulations prepared in accordance with the invention are particularly well adapted for the bonding of wood veneers to provide plywoods. Such adhesive formulations are spread on the wood plies in amounts ranging from about 18 to about 30 pounds of total solids per thousand square feet of double glue line. The assembly time can vary from about 5 to about 30 minutes or more and preferably from 10 to about 20 minutes. The press time for satisfactory results can be within the range from about 3 to about 10 minutes or more depending upon the temperature of the platens, the plies being bonded, the number of panels per opening and the like considerations, such as are apparent to those skilled in the art. After having been pressed and thoroughly cured at the bonding temperature for the glue formulation, the plywood is removed from the press and stacked for conditioning to a suitable residual moisture content.

shear testing. The specimens were then subjected to a 4 hour cyclic boil test as specified by the Douglas Fir Plywood Commercial Standard CS45–55 and subsequently sheared at the glue lines with a knife edge while wet.

The average percentage wood failure as the result of such testing was determined by visual observation. Amounts of the above described glue formulations used, the resin solids and total solids therein, along with the results of the testing operations, are shown in the following Table III.

TABLE III

| Glue | Percent Total Extension | Glue Spread Rate, Lbs./1,000 Ft.$^2$ Double Glue Line | | | Wood, Failure, Percent |
|---|---|---|---|---|---|
| | | Wet Spread | Resin Solids | Total Solids | |
| No. 1 | 47 | 52 | 12.4 | 20.7 | 83 |
| No. 2 | 100 | 52.3 | 8.35 | 19.1 | 7 |
| No. 3 | 100 | 45 | 10.5 | 21.8 | 80 |
| No. 4 | 150 | 37.8 | 8.6 | 22.2 | 80 |
| No. 5 | 250 | 41.3 | 7.5 | 26.7 | 75 |

It is evident from the foregoing operations that highly advantageous reductions in resin solids requirements are achieved with the use of the carbon extenders of the invention while still maintaining quality standards required for the manufacture of exterior grade plywood. A wood

TABLE I

| Component | Glue No. 1 | | Glue No. 2 | |
|---|---|---|---|---|
| | Amount (grams) | Mixing Time (minutes) | Amount (grams) | Mixing Time (minutes) |
| Water | 222 | | 35 | |
| Furafil 100 Extender [1] | 93.5 | 5 | [2] 12.5 | 2 |
| 50 Percent Aqueous Caustic | 52.7 | 15 | 2 | 2 |
| Sodium Carbonate | 21.6 | 5 | 2 | 15 |
| Water | 30 | 2 | | |
| Wheat Flour | 24 | 5 | | |
| Phenolic Resin [3] | 600 | 5 | 25 | 5 |
| Extension Based on Resin Solids | 47 | | 100 | |

[1] A commercial extender obtained as the residue from the acid hydrolysis of pentosan containing materials.
[2] Mixture of 10 grams of Furafil 100 extender and 2.5 grams of wheat flour.
[3] Thermosettable, based catalyzed, intermediate condensation product of phenol and formaldehyde in water, the aqueous solution containing 42.5 percent solids in Glue No. 1 and 50 percent solids in Glue No. 2.

Several highly extended adhesive compositions of the invention were prepared by mixing together aqueous phenolic resin, additional water, sodium carbonate and a finely divided carbon extender. The amounts of these components and mixing schedules are shown in Table II.

failure of about 65 percent after boiling in water for 4 hours is generally considered as adequate for exterior grade plywood.

The following examples illustrate the various embodiments of the invention. Example 1 will teach the use of

TABLE II

| Component | Glue No. 3 | | Glue No. 4 | | Glue No. 5 | |
|---|---|---|---|---|---|---|
| | (grams) | Time (minutes) | (grams) | Time (minutes) | (grams) | Time (minutes) |
| Commercial Phenolic Resin (aqueous solution with 42.5 percent solids) | 25 | | 25 | | 25 | |
| Water | 3.5 | | | | 5 | |
| Sodium Carbonate | 0.5 | 5 | 0.9 | 5 | 0.9 | 5 |
| Carbon Extender | 10.6 (coal) [1] | 5 | 15.9 (thermal carbon) [2] | 5 | 26.6 (thermal carbon) [2] | 5 |
| Water | 5.5 | 10 | 5 | 10 | | |
| Extension Based on Resin Solids | 100 | | 150 | | 250 | |

[1] 160 mesh sub-bituminous coal.
[2] Thermal carbon—Thermax MT brand.

Panels, 6 x 6 inches, 3 ply, were constructed of ⅛-inch veneer of Douglas fir heartwood. The above prepared glue formulations were spread on the veneer with a brush at the spread rates shown in Table III. These panels were left in closed assembly for 5 minutes, after which time the panel constructions were pressed, one per opening, at 275° F. platen temperature and 200 p.s.i. for 3.5 minutes.

Four specimens were cut from the resulting panels for carbon extenders as essentially the sole extender. The remaining Examples 2–3 illustrate the conjoint use of carbon extenders and causticized organic thickeners.

*Example 1*

In the following, extended adhesive compositions of the invention are compared with adhesive formulations in the prior art. The prior art formulations were prepared acording to the composition and mixing schedules set forth in the following table. Glue No. 1 is a standard commercial phenolic resin formulation for exterior grade plywood.

*Example 2*

In the present example, an extended adhesive composition of the invention is compared with a standard phenolic resin adhesive formulation. The standard adhesive composition was prepared in an identical manner to Glue No. 1 of Example 1.

A similar procedure was employed to prepare an extended adhesive composition utilizing a conjoint mixture of carbon extended and causticized organic material.

The composition schedule and mixing times are set forth in Table IV.

TABLE IV

| Component | Glue No. 2 | |
|---|---|---|
| | Amount (grams) | Mixing Time (minutes) |
| Water | 160 | |
| Furafil 100 Extender [1] | 69 | 5 |
| 50 Percent Aqueous Caustic | 39 | 15 |
| Sodium Carbonate | 16 | 5 |
| Water | 62 | 2 |
| Wheat Flour | 17.7 | 5 |
| Phenolic Resin [2] | ³442 | } 10 |
| Thermal Carbon Black | ³195 | |
| Total Glue Mix | 1,000.7 | |

[1] See footnote 1 Table I.
[2] See footnote 3 Table I.
³ These components were added alternately in four increments with intervening mixing of about two minutes.

The adhesive formulation of Table IV contained 18.8 percent resin solids and 50.5 total solids. The total extension was 150 percent by weight Furafil extender, wheat flour and carbon black based on the resin solids.

Douglas fir panels, 12 x 12 inches, 3 ply, were constructed of ⅛-inch veneer. The above prepared glue formulations were spread on the veneer with a commercial glue spreader at the spread rates shown in Table III. These panels were left in closed assembly for ten minutes, after which time the ⅜-inch panel constructions were pressed, two per opening, at 175 p.s.i. and 285° F. platen temperature for 5.25 minutes.

Ten 1 x 3⅛ inch specimens for shear testing were cut from the center section of the resulting plywood panels. Each specimen was scored to the glue line once on each side in a line transverse to its longitudinal axis. The scorings were placed so as to define a one inch square area. The scored specimens were then put through the cyclic boil test as specified by the Douglas Fir Plywood Commercial Standard CS45-55 and sheared while wet.

The percentage wood failure as the result of such testing was determined by visual observation. Amounts of the above described glue formulations used, the resin solids and total solids therein, along with the results of the testing operations, are shown in the following Table V.

TABLE V

| Run | Glue | Glue Spread Rate, Lbs./1,000 Ft.² Double Glue Line | | | Test Results on Boiled Specimens | |
|---|---|---|---|---|---|---|
| | | Wet Spread | Resin Solids | Total Solids | Shear,[1] P.s.i. | Percent Wood Failure |
| 1 | No. 1 | 52 | 12.4 | 20.7 | 155 | 83 |
| 2 | No. 1 | 53 | 12.7 | 21.1 | 121 | 78 |
| 3 | No. 2 | 52.3 | 9.85 | 26.5 | 190 | 97 |
| 4 | No. 2 | 48.7 | 9.15 | 24.6 | 200 | 98 |
| 5 | No. 2 | 44.5 | 8.35 | 22.5 | 200 | 97 |
| 6 | No. 2 | 39.4 | 7.4 | 19.5 | 173 | 83 |

[1] The shear testing was carried out with a Globe hydraulic shear testing machine, Model No. 41C according to test procedures described in Douglas Fir Plywood Commercial Standard CS45-55.

*Example 3*

Additional experiments were carried out wherein different carbons and coals were utilized to extend a standard phenolic resin formulation. The extended formulations were prepared in a manner similar to that employed in Example 1 from 9 parts water, 3.9 parts of Furafil 100 extender, 2.2 parts of 50 percent aqueous caustic, 0.9 part sodium carbonate, 3.5 parts water and 1.0 part wheat flour. These components were mixed sufficiently to provide a homogeneous dispersion. Thereafter 25 parts of a commercial phenol-formaldehyde thermosetting resin, containing 10.6 parts of resin solids, was added with stirring to the above mixture along with 11 parts of a particular finely divided carbon or coal. Up to 10 parts of additional water was added as needed to the mixture to give it a desired consistency.

Glues formulated, as above, had a total extension (Furafil, wheat flour and carbon extender) of 150 percent based on the resin solids. Some additional runs were made with other than 150 percent extension. In such instances, the amount of the carbon extender employed was adjusted in proportion to the desired level of extension. All glue compositions were tested by employing them in the manufacture of 6 inch square, 3 ply panels of ⅛-inch Douglas Fir veneer which had been conditioned to about 4 percent residual moisture. After coating the panels with a glue, the panels were given an assembly time of 5 minutes before pressing them. The panels were then pressed in a heated press by subjecting them to about 200 p.s.i. at 275° F. for 3.5 minutes.

Two 1 x 3 inch specimens were taken from the center of each cured plywood panel. These specimens were tested, after being boiled for 4 hours, by splitting them with a knife along the glue lines. Both glue lines were split and examined, and the average percentage wood failure was determined by visual observation.

The particular carbonaceous solids utilized as the adhesive composition consistency and total extension thereof, the amount of resin solids and total solids employed per thousand square feet of double glue line are set forth in the following Table VI along with the results of the testing operations.

TABLE VI

| Run No. | Carbon Extender (size 160 mesh or smaller) | Percent Resin Solids in Glue | Percent Total Solids in Glue | Percent Total Extension | Wet Glue Spread Rate, Lbs./ 1,000 Ft.² D.G.L. | Resin Solids in Glue Line | Percent Wood Failure [1] After 4 Hrs. of Boiling |
|---|---|---|---|---|---|---|---|
| 1 | Control [2] (Standard F18) | 24.5 | 40.3 | 46.2 | 52 | 12.7 | 75 |
| 2 | Control [2] (100 percent extension with Furafil and wheat flour) | 16.4 | 36.6 | 100 | 52 | 8.35 | 7 |
| 3 | Graphite | 18.8 | 50.5 | 150 | 45.8 | 8.6 | 80 |
| 4 | Anthracite | 18.2 | 48.7 | 150 | 51 | 9.2 | 79 |
| 5 | Bituminous coal—low volatiles | 18.8 | 50.5 | 150 | 48.3 | 9.2 | 70 |
| 6 | Bituminous coal—high volatiles | 17.3 | 46.3 | 150 | 48.3 | 8.4 | 70 |
| 7 | Thermax MT thermal carbon | 18.8 | 50.5 | 150 | 52.8 | 9.9 | 80 |
| 8 | ......do...... | 14.6 | 54.1 | 250 | 56.3 | 8.2 | 75 |
| 9 | Shell Carbon 60 thermal carbon | 18.8 | 50.5 | 150 | 44 | 8.3 | 80 |

[1] Average values for results on at least two specimens.
[2] The control glues were prepared according to industry prescribed procedures. The Control in Run 1 is a standard adhesive for exterior plywoods. In Run 2, the control contains 100 percent extension (80 percent Furafil extender and 20 percent wheat flour) but is otherwise identical to the control composition in Run 1.

What is claimed is:

1. A liquid adhesive composition consisting essentially of
   (a) one part by weight of a water-soluble thermosetting, partial condensation product of a phenol and an aldehydic material,
   (b) at least a material proportion up to about 3 parts by weight of a finely divided, solid, carbon extender, consisting of thermal carbon blacks and essentially carbonaceous materials composed mostly of carbon in the form of complex aromatic nuclei,
   (c) a catalytic amount of a basic alkali metal catalyst suitable for initiating the thermosetting reaction of the resin, and
   (d) sufficient water such that the total solids of the liquid adhesive composition is within the range of from about 35 to about 65 percent by weight of the total composition.

2. A liquid adhesive composition as in claim 1 wherein the partial condensation product is a water-soluble, thermosetting resin obtained by partially condensing, in the presence of a basic catalyst and aqueous solvent, from about 1.8 to about 3 moles of formaldehyde with each mole of phenol.

3. A liquid adhesive composition as in claim 1 wherein the carbon extender is a thermal carbon black.

4. A liquid adhesive composition as in claim 1 wherein the carbon extender is a finely divided coal having an average particle size small enough to pass an 80 mesh screen of the Tyler series.

5. A liquid adhesive composition consisting essentially of:
   (a) one part by weight of a water-soluble, thermosetting, partial condensation product of a phenol and an aldehydic material,
   (b) from about 1 part up to about 2.5 parts by weight of a finely divided solid, carbon extender, selected from the group consisting of thermal carbon blacks and essentially carbonaceous materials composed mostly of carbon in the form of complex aromatic nuclei,
   (c) a catalytic amount of a basic alkali metal catalyst suitable for initiating the thermosetting reaction of the resin, and
   (d) sufficient water such that the total solids of the liquid adhesive composition is within the range from about 35 to about 65 percent by weight of the total composition.

6. A liquid adhesive composition as in claim 5 wherein the carbon extender is a thermal carbon black.

7. A liquid adhesive composition consisting essentially of:
   (a) one part by weight of a water-soluble, thermosetting, phenolic resin obtained by partially condensing from about 1.8 to about 3 aldehyde equivalents per mole of phenol,
   (b) from about 0.01 to about 1 part by weight of a water-dispersible, causticized organic material,
   (c) at least a material proportion up to about 3 parts by weight of a finely divided, solid, carbon extender, selected from the group consisting of thermal carbon blacks and essentially carbonaceous materials composed mostly of carbon in the form of complex aromatic nuclei,
   (d) a catalytic amount of a basic alkali metal catalyst suitable for initiating the thermosetting reaction of the resin, and
   (e) sufficient water such that the total solid of the liquid adhesive composition is within the range from about 35 to about 65 percent by weight of the total composition.

8. A liquid adhesive composition as in claim 7 wherein the resin is a water-soluble, thermosetting resin of formaldehyde and phenol obtained by partially condensing in the presence of a basic catalyst from about 1.8 to about 3 equivalents of the aldehyde per mole of the phenol.

9. A liquid adhesive composition as in claim 7 wherein the carbon extender is carbon black.

10. A liquid adhesive composition as in claim 7 wherein the carbon extender is coal.

11. A liquid adhesive composition as in claim 7 wherein the carbon extender is coke.

12. A liquid adhesive composition as in claim 7 wherein the carbon extender is graphite.

13. A liquid adhesive composition as in claim 7 wherein the causticized organic material is causticized wheat flour.

14. A liquid adhesive composition as in claim 7 wherein the causticized organic material is selected from the group consisting of causticized residue from the acid hydrolysis of oat hulls and corn cobs.

15. A liquid adhesive composition as in claim 7 wherein the carbon extender is a thermal carbon black and the causticized organic material is a causticized amylaceous material.

16. A method for the production of a highly extended, liquid, phenolic resin adhesive composition which method consists essentially of mixing together
   (1) one part by weight of a water-soluble, thermosetting, phenolic resin obtained by partially condensing from about 1.8 to about 3 aldehyde equivalents per mole of phenol, hereinafter designated R,
   (2) from about 0.01 to about 1 part by weight of an organic extender reactive with an alkali metal hydroxide, hereinafter designated $E_A$,
   (3) sufficient alkali metal hydroxide for causticizing the organic extender, hereinafter designated A,
   (4) at least a material proportion up to about 3 parts by weight of a finely divided, solid, carbon extender selected from the group consisting of thermal carbon blacks and essentially carbonaceous materials composed mostly of carbon in the form of complex aromatic nuclei, hereinafter designated $E_C$,
   (5) a catalytic amount of a basic alkali metal catalyst suitable for initiating the thermosetting reaction of the resin, hereinafter designated C,
   (6) sufficient water such that the total solids of the liquid adhesive composition is within the range from about 35 to about 65 percent by weight of the total composition, hereinafter designated M,
said mixing being conducted according to the mixing schedule proceeding from left to right as follows: $[M, E_A\ E_C]_1\ [M, A, C]_2\ [E_A]_3\ [M, R, E_C, C]_4\ [M, R]_5$ wherein groups of materials within the brackets can be brought together in any order and the groups of materials brought together in the sequence designated, with intervening mixing sufficient to produce a homogeneous composition, the total amount of any component added being within the above prescribed proportions.

17. A method as in claim 16 wherein the resin is a water-soluble, thermosetting resin of formaldehyde and phenol obtained by partially condensing in the presence of a basic catalyst from about 1.8 to about 3 equivalents of the aldehyde per mole of the phenol.

18. A method as in claim 16 wherein the carbon extender is a thermal carbon black.

19. A method as in claim 16 wherein the catalyst is an alkali metal carbonate.

20. A method as in claim 16 wherein the causticized organic material is causticized wheat flour.

21. A method as in claim 16 wherein the causticized organic material is selected from the group consisting of causticized residues from the acid hydrolysis of oat hulls and corn cobs.

22. A liquid adhesive composition consisting essentially of:
   (a) one part by weight of water-soluble, thermosetting, phenolic resin obtained by partially condensing from about 1.8 to about 3 aldehyde equivalents per mole of phenol,
   (b) from about 0.05 to about 0.5 part by weight of a water-dispersible, causticized organic material, (c) from about 0.5 part up to 2.5 parts by weight of a finely divided, solid, carbon extender, selected from the group consisting of thermal carbon blacks and essentially carbonaceous materials composed mostly of carbon in the form of complex aromatic nuclei,
(d) a catalytic amount of a basic alkali metal catalyst suitable for initiating the thermosetting reaction of the resin, and
(e) sufficient water such that the total solids of the liquid adhesive composition is within the range from about 35 to about 65 percent by weight of the total composition.

No references cited.

J. NORRIS, *Assistant Examiner.*

WILLIAM H. SHORT, *Primary Examiner.*